Sept. 30, 1958      E. C. ELSNER      2,853,759
RELEASABLE CONNECTOR
Filed July 12, 1954
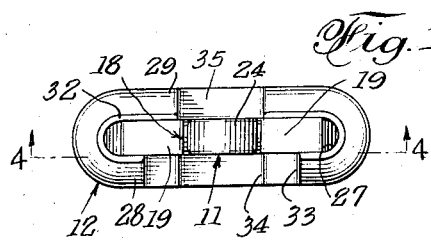
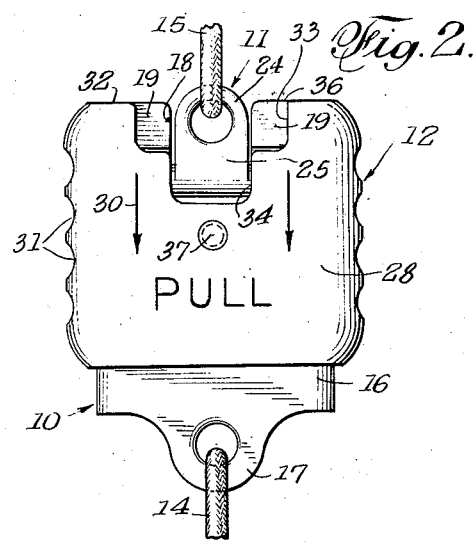
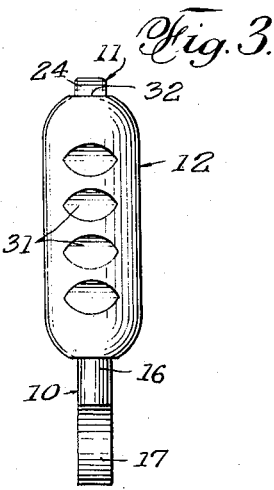
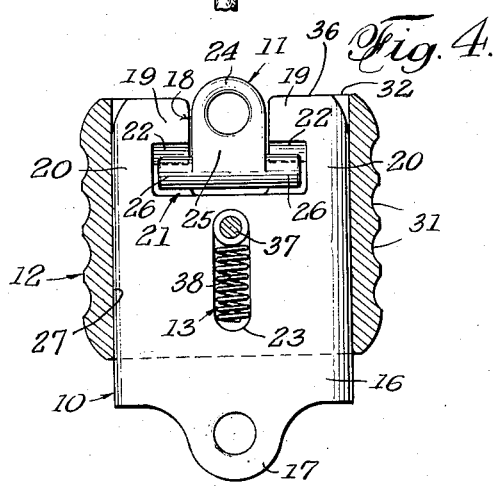
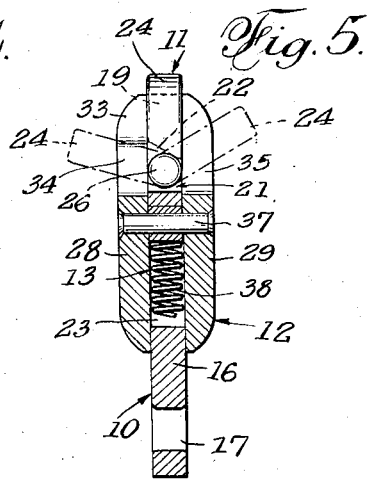
INVENTOR.
EDWIN C. ELSNER
BY
C. G. Stratton
ATTORNEY

United States Patent Office 2,853,759
Patented Sept. 30, 1958

2,853,759
RELEASABLE CONNECTOR

Edwin C. Elsner, Glendale, Calif., assignor, by mesne assignments, to Aeroquip Corporation, Jackson, Mich., a corporation of Michigan Application July 12, 1954, Serial No. 442,821

7 Claims. (Cl. 24—230)

This invention relates to means for releasably connecting two cords, ropes, or similar structures, or connecting the two ends of a cord or rope.

It is an object of this invention to provide a connector that is adapted to be subjected to strong pull between cord or rope ends which the same connects, and yet is adapted to be manually released with but little expenditure of force. Usually, a connector or buckle under great tension force requires a substantial application of power to effect release. This is mainly brought about by the necessity for manually overcoming, at least, a material part of the tension imposed on the connector by the cord, rope or strap ends it connects. The present connector embodies a manually operable release member that is not subject to the pull between the cord ends and has imposed on it only a small resultant component force offering immaterial resistance to manual operation of the release member.

Another object of the invention is to provide a connector, as above indicated, that safely and surely connects to cord ends and, upon release, suddenly separates thereby insuring dependable release of the connector and separation of the cord ends held connected thereby.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is an end elevational view of a connector according to the present invention.

Fig. 2 is a front elevational view thereof.

Fig. 3 is a side elevational view.

Fig. 4 is a longitudinal sectional view as taken on the plane of line 4—4 of Fig. 1.

Fig. 5 is a longitudinal sectional view as taken on a plane transverse to the plane of section of Fig. 4 and through the center of the connector.

The releasable connector that is illustrated comprises, generally, connector parts 10 and 11, a releasing member 12 slidably engaged over the connector parts, and means 13 resiliently biasing said member 12 in position to retain connection of the parts 10 and 11 and manually movable to a position effecting release of said parts 10 and 11. Cord ends or the like 14 and 15 are connected to connector parts 10 and 11, respectively.

The connector part 10 comprises a generally flat body 16 that is provided at one end with an eye 17 or the like, the latter being adapted to be connected to cord end 14. At the opposite end, said part 10 has a bifurcation 18 that is defined between opposed inwardly directed lugs 19. The latter extend from neck portions 20 of body 16. Said lugs, neck portions, and the adjacent end of body 16, enclose a transverse slot 21 that constitutes an enlargement of bifurcation 18. Said lugs are provided with edges 22 that are sloped downward from the front to the back of member 10 and, therefore, form inclined cam faces. Centrally of body 16 there is provided a longitudinal slot 23.

The connector part 11 has an eye 24 adapted to be connected to cord end 15. Said eye is formed on the end of a tab 25 from which extend integral trunnions 26. Said tab 25 is designed to loosely fit in the bifurcation 18 while the trunnions 26 extend loosely into the opposite ends of transverse slot 21. The thickness of connector parts 10 and 11 is the same but, in any case, the part 11 should not be thicker than part 10 although it may be slightly thinner.

The releasing member 12 comprises a sleeve of flattened form to encircle part 10 which is slidably fitted in a longitudinal passage 27 of said sleeve. The opposite sides or walls 28 and 29 of said sleeve are preferably flat, as shown, and one or both said sides may be provided with the legend "Pull" together with arrows 30 designating the direction of pull or movement of member 12 relative to part 10. The edges of member 12 are preferably rounded and may have transverse grooves 31 therein that minimize finger slippage when manually slid relative to connector part 10.

The front wall 28, in the portion overlying the bifurcation 18 and slot 21, is recessed downward from the top edge 32 to provide, first, a relatively wide opening 33 which conforms in size to the size of the lugs 19 and, then, a relatively narrow opening 34 which conforms in size to the size of the tab 25. The opening 33 has substantially the same width as slot 21 and opening 34 substantially the same width as bifurcation 18. The back wall 29 is provided with an opening 35 that is the same width as and in register with opening 34, said opening 35 extending to edge 32. Because of the openings 34 and 35, the part 11 is pivotally connected to part 10, as shown in Fig. 5.

From the above it will be clear that walls 28 and 29 retain trunnions 26 in slot 21 when the top edge 36 of part 10 is in substantial alignment with the top edge 32 of member 12. However, when member 12 is slid or retracted in the direction of the arrows 30, the slot 21 will be exposed by the opening 33 of the front wall. Therefore, when the trunnions 26 are forced into engagement with cam edges 22 by an opposite pull on the cord ends 14 and 15, said cam edges will laterally displace said trunnions out of the slot 21 and effect separation of connector part 11 from part 10.

The means 13 that resiliently biases member 12 to trunnion-trapping position comprises a pin 37 that extends through slot 23 in body 16 of part 10 and is riveted into the walls 28 and 29, and a coil spring 38 disposed within said slot with one end in abutment with said pin and the other abutting the lower end of said slot. Thus, spring 38, by pressing pin 37 against the upper end of slot 23, exerts a resilient force that biases member 12 to connector parts connecting position.

In use, the tension on the connector holds the same in a stationary position since cords 14 and 15 are taut under the force applied. To release the connector, it is only necessary to pull on the member 12 in the direction of the arrows 30 and, therefore, effect separation as above indicated.

It will be noted that the only force on member 12, other than the light one imposed by spring 38, is the angular component of the force imparted on trunnions 26 by cam edges or faces 22. This latter force offers immaterial resistance to sliding movement of member 12. Hence, the release member 12 can be easily operated regardless of the magnitude of the tension on the connector.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A connector comprising a part provided with oppositely directed trunnions, a second part provided with opposed inwardly directed lugs engaged by said trunnions when the parts are pulled away from each other, a sleeve slidingly engaged over said parts and provided with portions in lateral engagement with said trunnions, and resilient means holding said sleeve projected in said trunnion-engaging position, said sleeve being manually retractable to move the mentioned sleeve portions out of engagement with said trunnions.

2. A connector according to claim 1: said lugs being provided with sloping faces adapted to be engaged by said trunnions that are disposed at a forward and outward angle with respect to the sleeve portions that are engaged with the trunnions.

3. A connector according to claim 1: said lugs being provided with cam faces that are engaged by the trunnions and said faces being so directed as to laterally displace said trunnions upon retraction of the sleeve.

4. A connector comprising a part provided with oppositely directed trunnions, a second part provided with opposed inwardly directed lugs engaged by said trunnions when the parts are pulled away from each other, a sleeve slidingly engaged over said parts and provided with portions in lateral engagement with said trunnions, and resilient means holding said sleeve projected in said trunnion-engaging position, said sleeve being manually retractable to move the mentioned sleeve portions out of engagement with the trunnions, said second-mentioned part having a longitudinal slot therein, a pin carried by the sleeve and extending through said slot to, thereby, limit retractive movement of the sleeve.

5. In a separable connector, a part provided with spaced inwardly directed lugs having sloping faces, a second part provided with oppositely directed trunnions disposed between the lugs with the trunnions in contact with the sloping faces, and retractable means overlying the trunnions and retaining the same in engagement with the sloping lug faces while said parts are being pulled opposite directions.

6. In a separable connector, a part provided with spaced inwardly directed lugs having sloping faces, a second part provided with oppositely directed trunnions disposed between the lugs with the trunnions in contact with the sloping faces, and retractable means overlying the trunnions and retaining the same in engagement with the sloping lug faces while said parts are being pulled in opposite directions, said retractable means comprising a sleeve carried by the first mentioned part and having portions overlying the trunnions.

7. A connector comprising a part provided with a pair of opposite and outwardly directed trunnions, a second part provided with opposite and inwardly directed lugs, said lugs having cam edges engageable by said trunnions when said parts are connected, a retractable sleeve slidingly engaged over said parts, said sleeve having openings in each wall of greater width than the width of said first mentioned part, and means to retract said sleeve.

References Cited in the file of this patent

UNITED STATES PATENTS

| | | |
|---|---|---|
| 244,475 | Orcutt | July 19, 1881 |
| 842,482 | Matson | Jan. 29, 1907 |
| 2,305,234 | Bratz | Dec. 15, 1942 |
| 2,449,167 | Hopewell | Sept. 14, 1948 |